United States Patent [19]

Phillips et al.

[11] Patent Number: 5,020,092
[45] Date of Patent: * May 28, 1991

[54] DUAL-BANDWIDTH CELLULAR TELEPHONE

[75] Inventors: Sharon E. T. Phillips, Lake in the Hills; Scott N. Carney, Hoffman Estates, both of Ill.

[73] Assignee: Motorola, Inc., Schaumburg, Ill.

[*] Notice: The portion of the term of this patent subsequent to Nov. 20, 2007 has been disclaimed.

[21] Appl. No.: 572,724

[22] Filed: Aug. 24, 1990

Related U.S. Application Data

[62] Division of Ser. No. 370,666, Jun. 23, 1989, Pat. No. 4,972,455.

[51] Int. Cl.⁵ .................. H04M 11/00; H04B 1/40
[52] U.S. Cl. ............................. 379/59; 379/63; 455/77
[58] Field of Search ......................... 379/57-61, 379/63; 455/33, 34, 54, 56, 58, 77, 340, 188

[56] References Cited

U.S. PATENT DOCUMENTS

| 4,132,952 | 1/1979 | Hongu et al. | 325/459 |
|---|---|---|---|
| 4,135,158 | 1/1979 | Parmet . | |
| 4,268,915 | 5/1981 | Parmet . | |
| 4,408,348 | 10/1983 | Theriault | 455/188 |
| 4,527,281 | 7/1985 | Imagawa et al. | 455/165 |
| 4,573,211 | 2/1986 | Kupfer | 455/188 |
| 4,577,171 | 3/1986 | Heigl et al. | 334/1 |
| 4,710,973 | 12/1987 | Suzuki | 455/188 |
| 4,736,457 | 4/1988 | Kupfer | 455/188 |
| 4,802,238 | 1/1989 | Fischer et al. | 455/188 |

OTHER PUBLICATIONS

Hewlett Packard Operating Manual No. 8901A, Entitled "Modulation Analyzer", Mar. 1980.
Collins Radio Company Instruction Book No. 75A-3, Entitled "Amateur-Band Receiver", Jun. 1, 1953.

Primary Examiner—Jin F. Ng
Assistant Examiner—Dwayne D. Bost
Attorney, Agent, or Firm—Rolland R. Hackbart

[57] ABSTRACT

A unique dual-bandwidth cellular telephone includes a transceiver (100) having a dual bandwidth receiver, an audio/logic unit (200) having dual control programs, and a handset unit (300). The dual bandwidth receiver of the transceiver (100) has different filters (408 and 410) in the intermediate frequency section thereof which are switchably selected depending on which cellular telephone system is available. When service is not available in one of the cellular telephone systems, the unique cellular telephone automatically switches the receiver bandwidth and control program for operating on the other cellular telephone system.

12 Claims, 5 Drawing Sheets

DUAL-BANDWIDTH CELLULAR TELEPHONE

This is a division of application Ser. No. 07/370,666, filed June 23, 1989 now U.S. Pat. No. 4,972,455.

BACKGROUND OF THE INVENTION

The present invention is generally related to radiotelephones, and more particularly to a cellular telephone with a dual bandwidth for operating on two different cellular telephone systems.

Cellular telephones currently are designed to operate on only one type of cellular telephone system. Most countries of the world have adopted only one type of cellular telephone system. Thus, cellular telephones which operate on only one type of cellular telephone system have been adequate for the cellular systems in most countries of the world. In some countries, cellular systems have replaced and/or supplemented older non-cellular radio telephone systems. For instance, in the United States, cellular systems have replaced and/or supplemented the non-cellular, improved mobile telephone systems (IMTS) which provided radio telephone services since the late 1960s. In order to allow use of both the IMTS systems and the cellular systems, a prior art radio telephone included both an IMTS transceiver and a cellular transceiver which were coupled to a common handset control unit. In this prior art radio telephone, audio signals were switched by user selection from either the IMTS transceiver or the cellular transceiver to the common handset control unit use of two transceivers to provide services on two different radio telephone systems is both bulky and relatively expensive. Another type of signal switching found in prior art test equipment is mechanical bandwidth switching of the intermediate frequency (IF) section of the radio receiver in a modulation analyzer. The IF section of such test equipment was switched between two different bandwidths by diode switching circuitry in response to user activation of a mechanical switch. However, mechanical IF bandwidth switching of such test equipment is not suitable for use in cellular telephones and also requires user intervention and additional circuitry, increasing the cost and complexity thereof. For the foregoing reasons, there is a need for a cellular telephone which accommodates different receiver bandwidths for operating on different cellular telephone systems.

OBJECTS OF THE INVENTION

Accordingly, it is an object of the present invention to provide a unique multi-bandwidth cellular telephone which includes bandwidth switching in the receiver thereof for automatically operating on different cellular telephone systems.

It is another object of the present invention to provide a unique multi-bandwidth cellular telephone which includes bandwidth switching in the intermediate frequency section of the receiver thereof for automatically operating on different cellular telephone systems.

DETAILED DESCRIPTION OF THE PREFERRED EMBODIMENT

Figure 1:
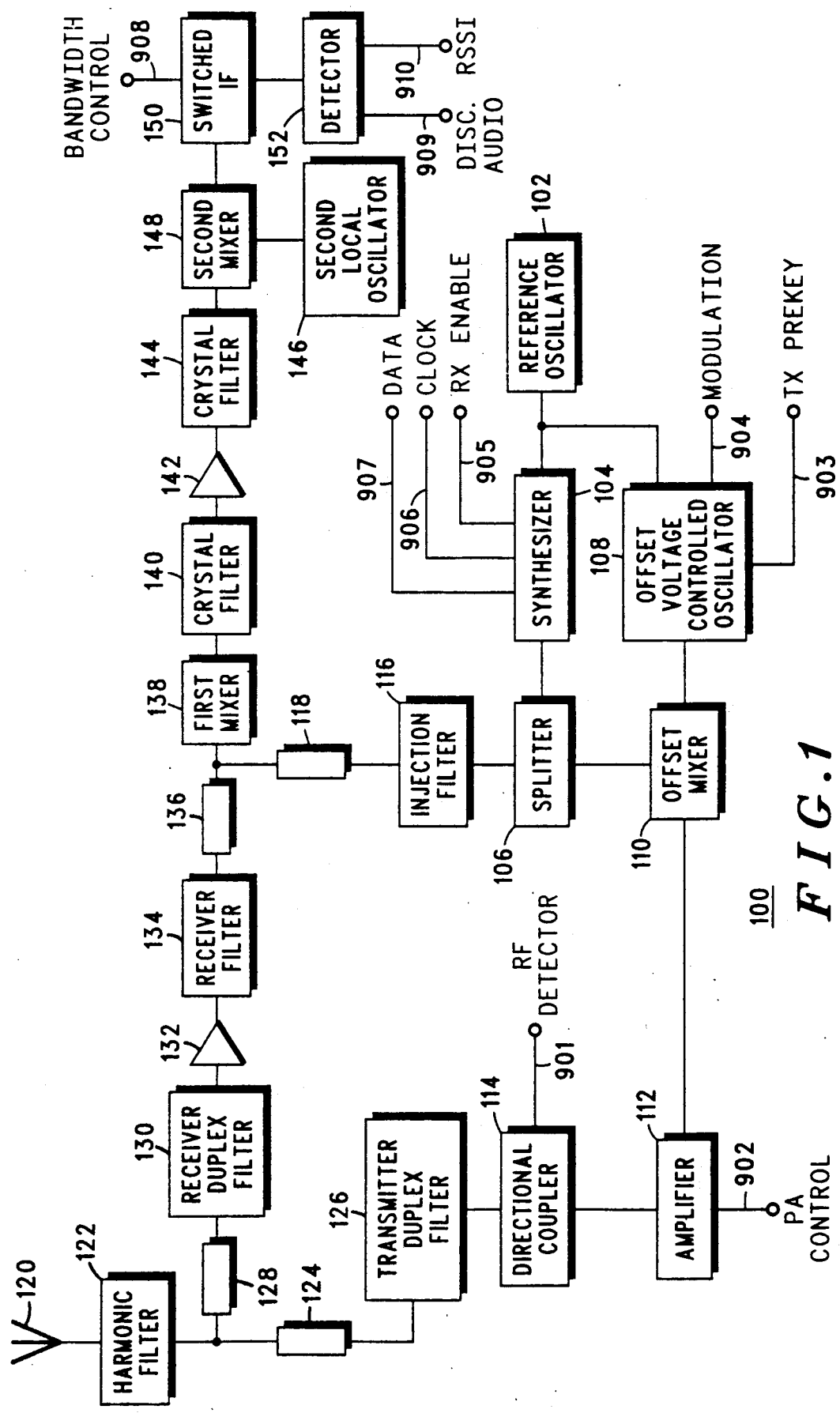
FIG. 1 is a block diagram of the transceiver of a cellular telephone embodying the present invention.
Figure 2:
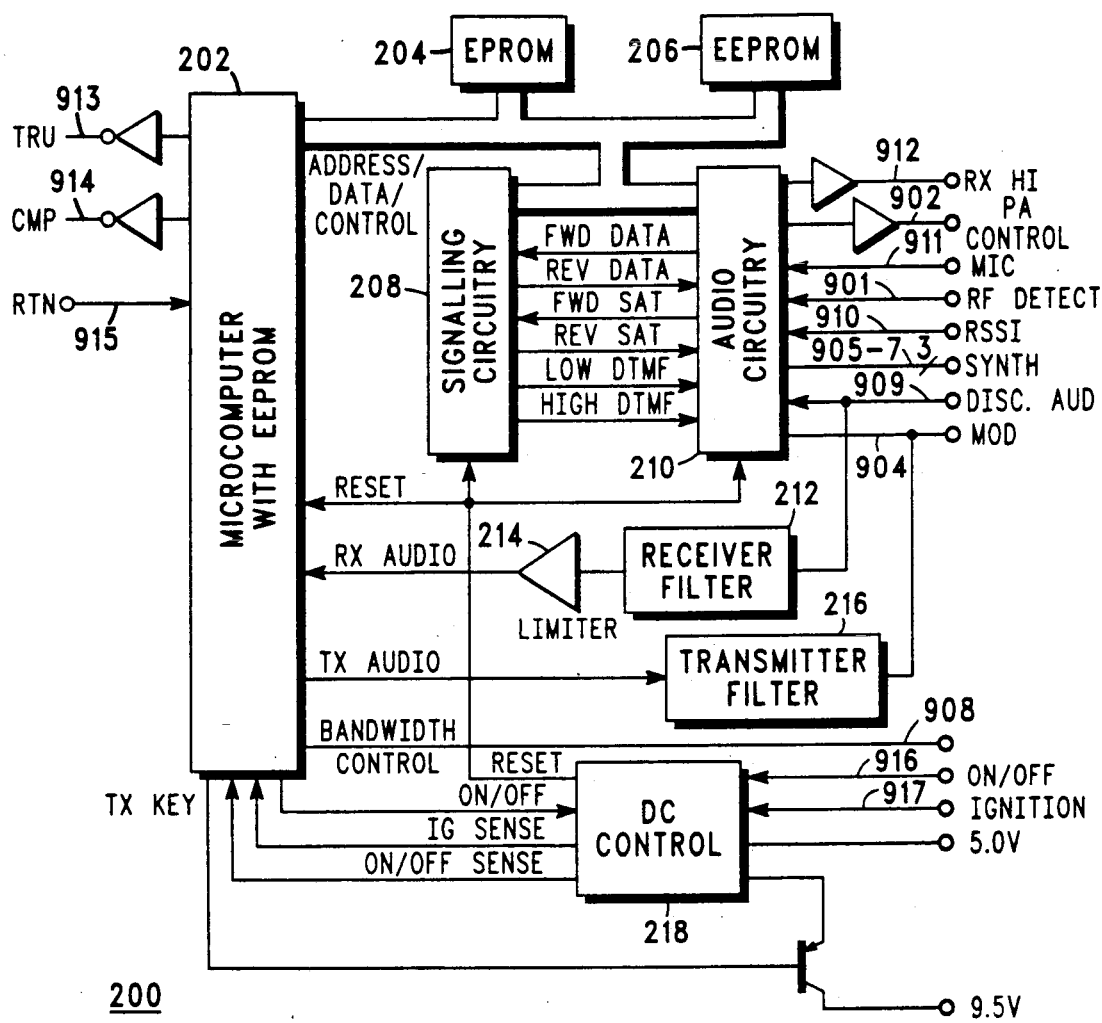
FIG. 2 is a block diagram of the audio/logic unit of a cellular telephone embodying the present invention.
Figure 3:
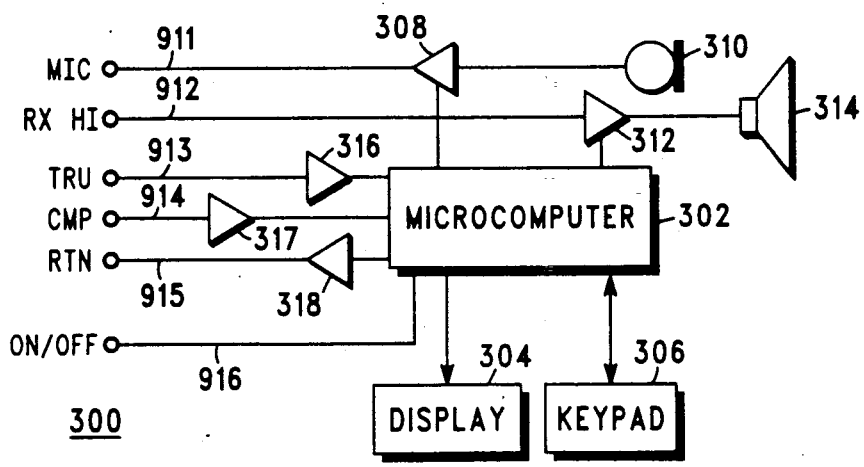
FIG. 3 is a block diagram of the handset unit of a cellular telephone embodying the present invention.

Referring to FIGS. 1, 2 and 3, there is illustrated a block diagram of the transceiver 100, audio/logic control unit 200, and handset unit 300, respectively, of a dual-bandwidth cellular telephone embodying the present invention. Cellular telephone of the present invention may be advantageously utilized in any country or cellular service area where two different cellular telephone systems exist. For example, a TACS-type cellular telephone system and a US-type cellular telephone system may provide at least partial overlapping cellular telephone service to the same geographical area. Currently, both Japan and Hong Kong have approved two different cellular telephone systems. In cities or highways where only one of the two cellular telephone systems provides cellular service, the cellular telephone of the present invention automatically switches to the serving cellular system insuring that the user will always have access to available cellular service. For convenience, two different exemplary cellular telephone systems will be referred to as cellular system A and cellular system B hereinbelow.

Referring next to the block diagram in FIG. 1, transceiver 100 is preferably a cellular transceiver operable in the transmitter frequency range from 915 to 940 MHz and the receiver frequency range from 860 to 885 MHz. Except for block 150, the blocks of transceiver 100 may be implemented by conventional cellular transceiver circuitry, such as, for example, the circuitry of the US-type cellular telephone transceiver shown and described in Motorola Instruction Manual No. 68P81070E40, entitled "DYNATAC Cellular Mobile Telephone," published by and available from Motorola C & E Parts, 1313 East Algonquin Road, Schaumburg, Ill. 60196.

RF signals on cellular radio channels are transmitted and received by transceiver 100 via antenna 120 and harmonic filter 122. RF signals for transmission by antenna 120 are applied to harmonic filter 122 by transmitter duplex filter 126 via duplex transmission line 124. The transmitting circuitry of transceiver 100 includes offset voltage-controlled oscillator (VCO) 108, offset mixer 110, power amplifier 112, and directional coupler 114, which generate the transmitter signal of the RF channel to which transceiver 100 is tuned. Synthesizer 104 is coupled to reference oscillator 102 for generating the receiver injection signal which is split by splitter 106 and coupled to offset mixer 110 and injection filter 116. Synthesizer 104 is tuned to a particular radio channel by audio logic control unit 200 using data signal 907, clock signal 906, and RX enable signal 905. Offset VCO 108 is coupled to reference oscillator 102 for generating an offset signal which is mixed with the receiver injection signal in offset mixer 110 to generate the transmitter signal. The circuitry of offset VCO 108 is powered up and down in response to the TX prekey signal in order to save standby current drain. Amplifier 112 is responsive to PA control signal 902 form audio/logic control unit 200 for generating up to eight different power levels at its output. Directional coupler 114 produces RF detect signal 901 which has a magnitude that is proportional to the magnitude of the output of amplifier 112. RF detect signal 901 from directional coupler 114 is coupled to audio logic control unit 200, where it is converted to digital form and used to generate PA control signal 902 for maintaining the output of amplifier 112 at the desired power level.

In the receive path of transceiver 100, receive signals are coupled from harmonic filter 122 by duplex transmission line 128 to receiver duplex filter 130, RF amplifier 132, receiver filter 134 and transmission line 136 to first mixer 138, where the filtered RF signals are mixed with the receiver injection signal from injection filter 116 and transmission line 118 to produce the first IF signal. The first IF signal from first mixer 138 is coupled to crystal filter 140, IF amplifier 142 and crystal filter 144 for selecting the desired component thereof. The output of crystal filter 144 is coupled to second mixer 148, where it is mixed with second local oscillator 146 to produce the second IF signal. The second IF signal from second mixer 148 is coupled to switched IF filter 150, which includes first and second filters having different bandwidths for selecting the desired components thereof for cellular system A and cellular system B, respectively. In the preferred embodiment, the first filter in switched IF filter 150 has a wide bandwidth, that is a 3 dB bandwidth of ±12 KHz, and the second filter in switched IF filter 150 has a narrow bandwidth, that is a 3 dB bandwidth of ±6 kHz. In practicing the present invention, switched IF filter 150 may include additional filters for selecting the desired components thereof for additional cellular systems over and above cellular systems A and B. Bandwidth control signal 908 from audio/logic control unit 200 is coupled to switched IF filter 150 for switching between the first and second filters thereof. When bandwidth control signal 908 has a binary one state, the first filter of switched IF filter 150 is selected for providing a wide bandwidth for cellular system A. When bandwidth control signal 908 has a binary zero state, the second filter of switched IF filter 150 is selected for providing a narrow bandwidth for cellular system B. The output of switched IF filter 150 is coupled to detector 152 which produces discriminator audio signal 909 and received signal strength indicator signal (RSSI) 910, which signals are coupled to audio/logic control unit 200.

Referring next to the block diagram of FIG. 2, audio/logic control unit 200 includes microcomputer 202 which controls the operation of transceiver 100 in accordance with a control program stored EPROM memory 204 and including a first portion for signalling and call processing in cellular system A, a second portion for signalling and call processing in cellular system B, and a third portion for the user interface in cellular systems A and B. In the preferred embodiment, microcomputer 202 is a Motorola type 68HC11 microprocessor integrated circuit. Microcomputer 202 is also coupled to EEPROM memory 206 for accessing telephone numbers, serial numbers, and other call processing information stored therein. In the preferred embodiment, the dual-bandwidth cellular telephone of the present invention has two telephone numbers, one for cellular system A and another for cellular system B. Microcomputer 202 is coupled to audio circuitry 210 for controlling transmit and receive audio paths, the microphone signal 911 and the RX HI signal, respectively, for operation in both cellular systems A and B. Audio circuitry 210 is described in further detail in U.S. Pat. No. 4,741,018. For operation in cellular system A, microcomputer 202 is coupled to signalling circuitry 208 for generating and processing high-speed signalling data (FWD DATA and REV DATA), supervisory audio tones (FWD SAT and REV SAT), and dual tone multifrequency dialing signals (LOW DTMF and HIGH DTMF) utilized in call processing. Signalling circuitry 208 is described in further detail in U.S. Pat. Nos. 4,302,845 and 4,312,074. When operating in cellular system B, low-speed signalling data in discriminator audio signal 909 from transceiver 100 is coupled to microcomputer 202 by way of receiver filter 212 and limiter 214. Low-speed signalling data from microcomputer 202 for transmission in cellular system B is coupled by transmitter filter 216 to modulation signal 904 for application to offset VCO 108 of transceiver 100. DC control circuitry 218 is responsive to ON/OFF signal 916 from handset unit 300 and ignition sense signal 917 from the vehicle ignition switch for generating the reset signal for initializing microcomputer 202, signalling circuitry 208 and audio circuitry 210, and generating the 5 V and switched 9.5 V power supplies for powering the circuitry of transceiver 100, audio/logic control unit 200 and handset unit 300. DC control circuitry 218 includes conventional voltage regulators and is described in further detail in U.S. Pat. No. 4,798,975.

Referring next to the block diagram of FIG. 3, handset unit 300 includes microcomputer 302 for scanning keypad 306 to detect activated keys and for loading information into display 304 indicating telephone numbers and predetermined status of the dual-mode cellular telephone of the present invention. Handset unit 300 also includes microphone 310 and speaker 314 which are coupled by amplifiers 308 and 312 to microphone signal 911 and RX HI signal 912, respectively, and which may be switched on and off by microcomputer 302. Handset unit 300 also includes several indicators, one of which is a no-service indicator providing a visual indication of the availability of cellular service. Microcomputer 302 generates the ON/OFF signal 916 in response to activation of the ON/OFF key of keypad 306. Microcomputer 302 communicates with microcomputer 202 of audio/logic control unit 200 via a three-wire data bus 913, 914 and 915 which is illustrated and described in the U.S. Pat. No. 4,369,516. The TRU, CMP and RTN signals 913, 914 and 915 of the three-wire data bus are buffered by amplifiers 316, 317 and 318, respectively. Handset unit 300 may be located in a separate housing in the case of a mobile cellular telephone and may be located together with transceiver 100 and audio/logic control unit 200 in a common housing in a case of portable cellular telephone.

Figure 4:
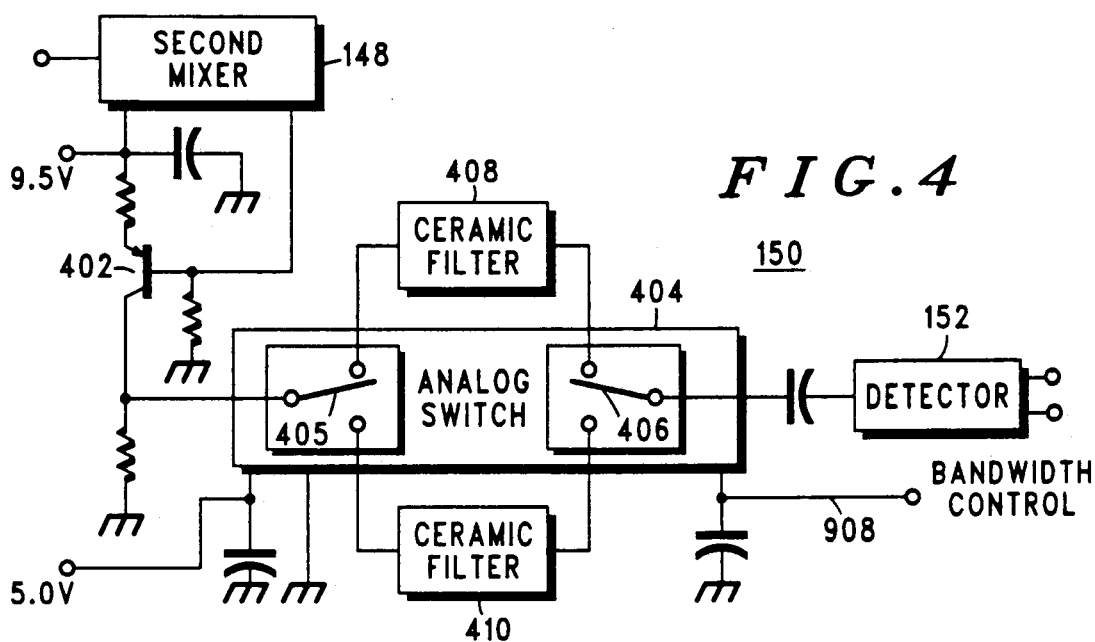
FIG. 4 is a circuit diagram of the switched IF circuitry of the cellular transceiver in FIG. 1.

Referring next to the circuit diagram of FIG. 4, there is illustrated the detailed circuitry comprising the preferred embodiment of switched IF filter 150 in FIG. 1. Switched IF filter 150 includes first filter 408 and second filter 410 which are selected by bandwidth control signal 908. The output of second mixer 148 is coupled to buffer amplifier 402, the output of which is applied to the input of analog switch 404. In the preferred embodiment, analog switch 404 is a Motorola type MC14551

CMOS analog switch integrated circuit. Analog switch 404 includes first and second switches 405 and 406 for coupling either first filter 408 or second filter 410 to detector 152. When the bandwidth control signal 908 has a binary one state, first filter 408 is coupled by analog switch 404 to detector 152. When bandwidth control signal 908 has a binary zero state, second filter 410 is coupled by analog switch 404 to detector 152. In the preferred embodiment, first filter 408 is a 455 kHz ceramic filter having a wide bandwidth, that is a 3 dB bandwidth of ±12 kHz, and second filter 410 is a 455 kHz ceramic filter having a narrow bandwidth, that is a 3 dB bandwidth of ±6 kHz.

Figure 5:
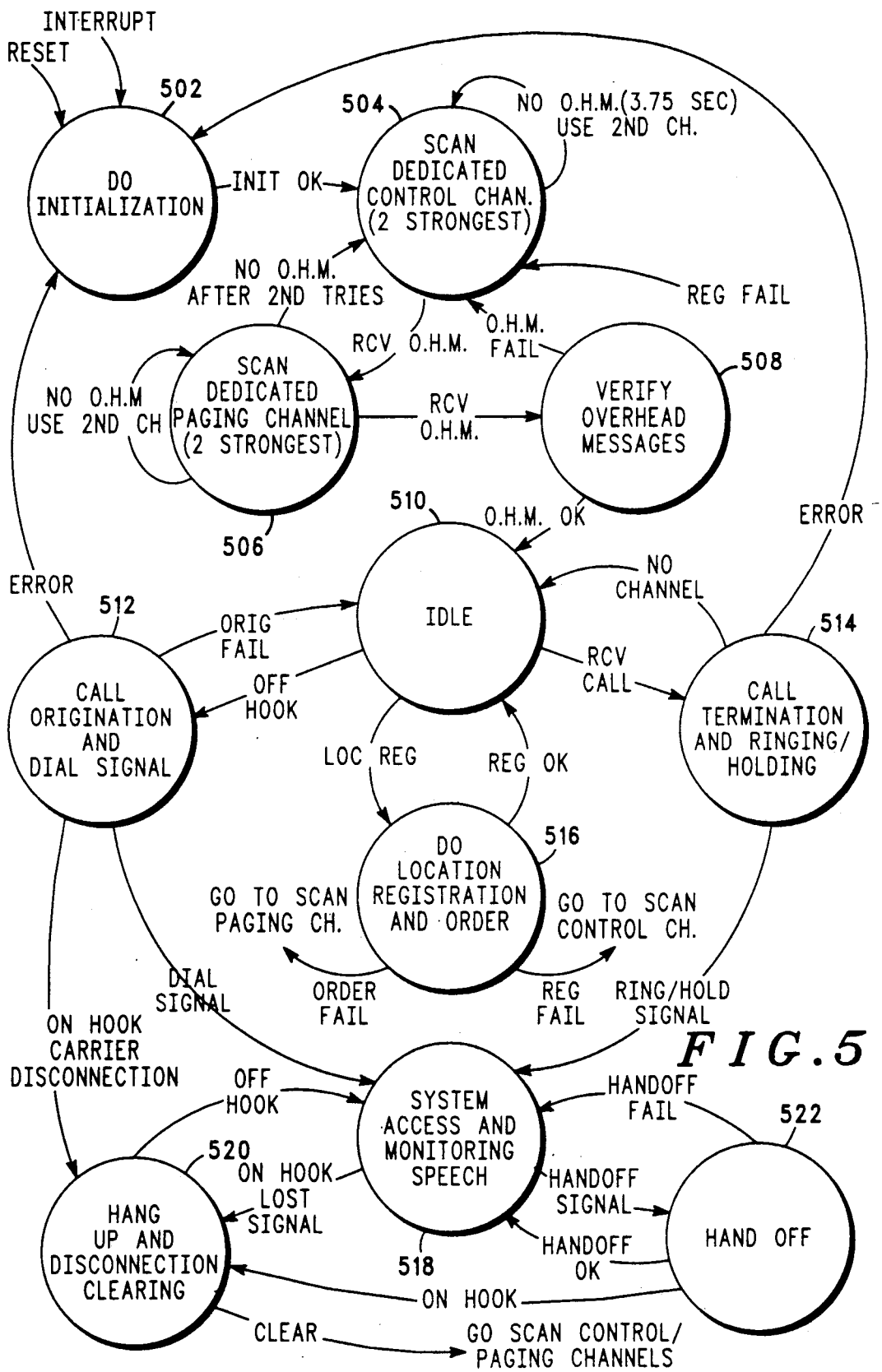
FIG. 5 is a flow diagram for the process used by microcomputer 202 in FIG. 2 for signalling and communications in cellular system A.
Figure 7:
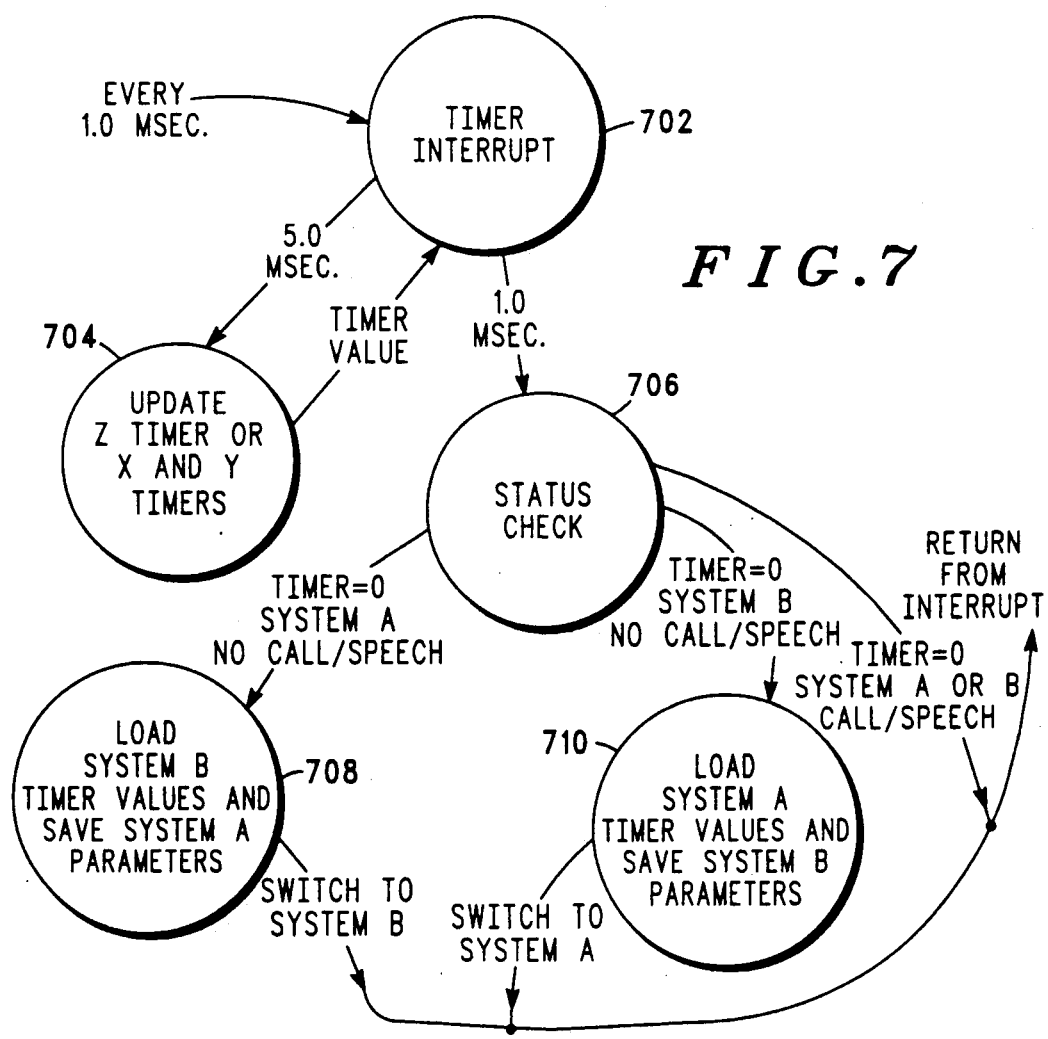
FIG. 7 is a flow diagram for the process used by microcomputer 202 in FIG. 2 for processing interrupts and switching between cellular systems A and B.

Referring next to the flow diagram of FIG. 5, there is illustrated the signalling and communications processes executed by microcomputer 202 in audio logic control unit 200 in FIG. 2 under control of the first portion of the control program for cellular system A. Initially, display 304 in handset unit 300 is loaded with a pre-selected message indicating system A operation and is subsequently cleared in response to the first key activation. The flow diagram of FIG. 5 is entered at block 502 in response to either an interrupt, the reset signal or when returning from system B. After initialization, the dedicated control channels are scanned at block 504 and the two strongest control channels are selected. If no service is available in system A for a predetermined period of time, program control may transfer in response to an interrupt from the first portion of the control program to the second portion of the control program for operation in cellular system B, as illustrated in FIG. 7. For example, a no service condition would arise when the cellular telephone moves from a city covered by cellular system A to a highway or another city covered only by cellular system B. In this situation, microcomputer 202 branches to the second portion of the control program for resuming operation in cellular system B so that cellular service is not interrupted, according to a feature of the present invention. If a control channel is selected, the paging channels are then scanned at block 506 and the two strongest paging channels are selected. If service is available, the overhead message train transmitted on the paging channel is verified at block 508 and thereafter program control proceeds to idle block 510. From idle block 510 a call origination may occur at block 512, location registration may take place at block 516 and an incoming call termination may be processed at block 514. From block 512 or block 514, program control proceeds to blocks 518, 520 and 522 for processing the call origination or call termination, respectively. At block 518, system access and speech monitoring is performed and if necessary, a handoff is executed at block 522 or if service is lost a hang-up and disconnection clearing function is performed at 520. When the telephone call is terminated, program control is transferred back to block 504 to repeat the foregoing process.

Figure 6:
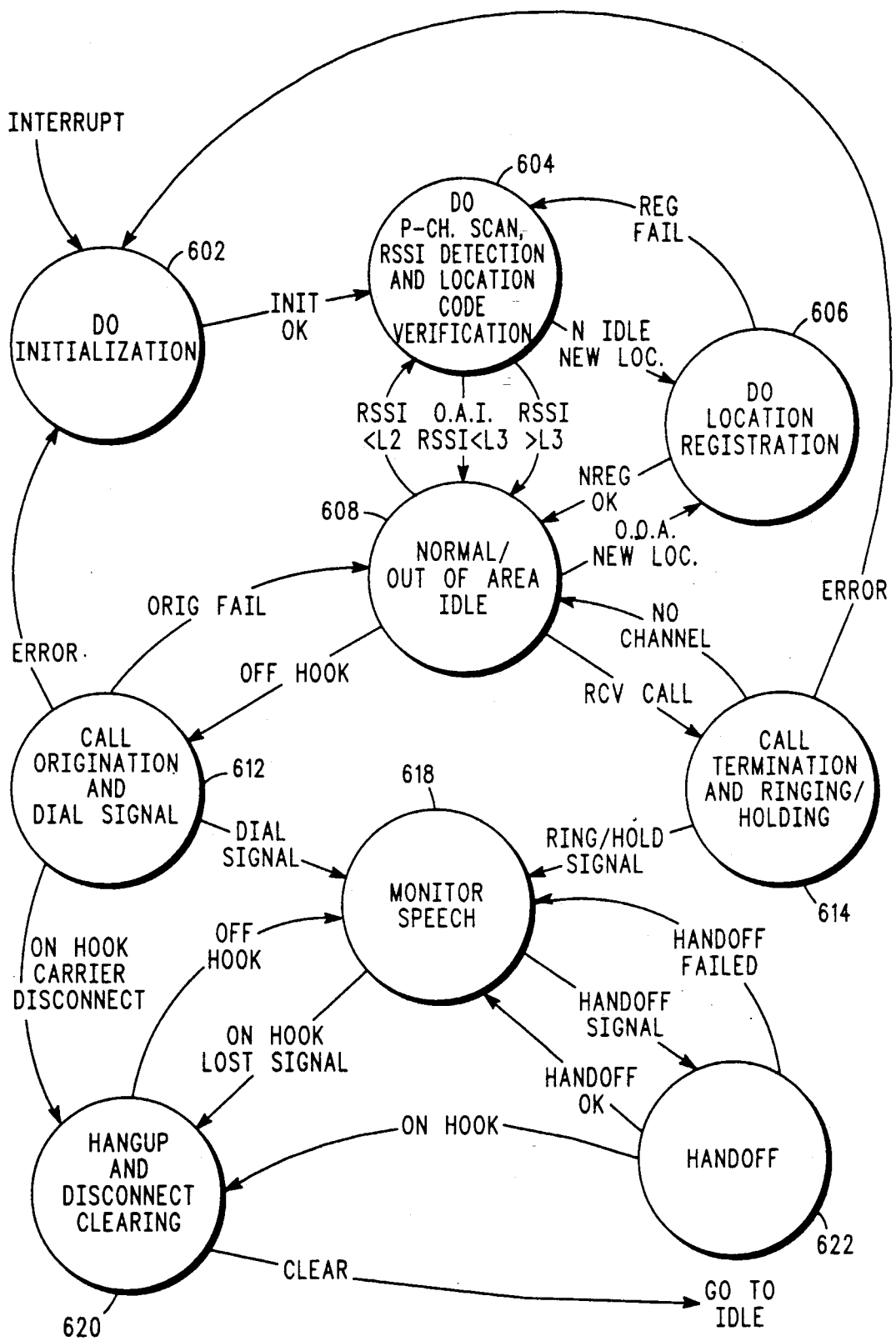
FIG. 6 is a flow diagram for the process used by microcomputer 202 in FIG. 2 for signalling and communications in cellular system B.

Referring next to the flow diagram of FIG. 6, there is illustrated the process performed by microcomputer 202 of audio/logic control unit 200 in FIG. 2 under control of the second portion of the control program for signalling and communications in cellular system B. Entering in response to an interrupt, initialization is performed at block 602. During system B operation, a "ROAM" indicator in handset unit 300 is continuously flashed, and display 304 in handset unit 300 is initially loaded with a pre-selected message indicating system B operation and is subsequently cleared in response to the first key activation. Next, at block 604, the P-channel is scanned, RSSI signal 910 is detected, and the location code is verified. If no service is available in system B for a predetermined period of time, program control may transfer in response to an interrupt from the second portion of the control program back to the first portion of the control program to resume operation in cellular system A, as illustrated in FIG. 7. At the time of such transfer, the current system parameters are stored in the EEPROM memory of microcomputer 202 of audio/logic control unit 200 to indicate that operation in cellular system B was attempted. If the location code indicates a new location was entered, location registration is performed at block 606. Otherwise, program control proceeds to idle block 608 to wait for an outgoing call origination or an incoming call termination. Also, at block 608, RSSI signal 910 is continuously checked to determine if an acceptable RF signal is being received. If RSSI signal 910 is less than level L2, program control transfer back to block 604. As long as the RSSI signal has a magnitude greater than level L3, program control remains at block 608. In the preferred embodiment, levels L2 and L3 correspond to RF signal levels of −96 dBm and −91 dBm, respectively. From idle block 608, an outgoing call origination may occur at block 612 or an incoming call termination may be processed at block 614. From block 612 or block 614, program control proceeds to blocks 618, 620 and 622 for processing the call origination or call termination, respectively. At block 618, RSSI and speech monitoring is performed and if necessary, a handoff is executed at block 622 or, if service is lost, a hang-up and disconnection clearing function is performed at block 620. When the telephone call is terminated, program control is transferred back to block 608 to repeat the foregoing process.

Referring next to the flow diagram of FIG. 7, there is illustrated the process performed by microcomputer 202 of audio/logic control unit 200 in FIG. 2 for processing interrupts and automatically switching between cellular systems A and B. Three programmable timers, the Z timer, X timer, and Y timer, are used to determine when to switch between systems A and B. The Z timer is used for timing the loss of service in system A. A suitable value for the Z timer is one minute. The X timer is used for timing the loss of service in system B. A suitable value for the X timer is one-half minute. The Y timer is used for timing the duration of service in system B. A suitable value for the Y timer is one minute. During initialization for system A or B, the Z timer or the X and Y timers are set to their nominal values and thereafter decremented in response to the one millisecond interrupt as explained hereinbelow. In the preferred embodiment of the dual-bandwidth cellular telephone, automatic switching may also be disabled and switching between systems A and B may be done manually in response to pre-selected key sequences entered by the user on keypad 306.

Entering the flow diagram of FIG. 7 in response to the one millisecond interrupt from the control program for cellular system A, the interrupt timer is checked at block 702 to determine if five milliseconds has elapsed. If five milliseconds has elapsed and service is not available in system A, the Z timer is decremented at block 704. If service is available in system A, the Z timer is set to its nominal value again. Next, at block 706, a status check is made to determine if the Z timer has been decremented to zero. If the Z timer has been decremented to zero, then at block 708, the X and Y timers are set to their nominal values and the system A call parameters are saved. Thereafter, operation is switched to system B by branching to the second portion of the control program when returning from the one millisecond interrupt. Entering the flow diagram of FIG. 7 in response to the one millisecond interrupt from the control program for cellular system B, the interrupt timer is checked at block 702 to determine if five milliseconds has elapsed. If five milliseconds has elapsed and service is not available in system B, the X timer is decremented at block 704. If service is available in system B, the X timer is set to its nominal value again. If five milliseconds has elapsed and service is available in system B, the Y timer is decremented at block 704. Next, at block 706, a status check is made to determine if the X or Y timer has been decremented to zero. If the X or Y timer has been decremented to zero, then at block 710, the Z timer is set to its nominal value and the system B call parameters are saved. Thereafter, operation is switched to system A by branching to the first portion of the control program when returning from the one millisecond interrupt. Even if service is available in system B, the Y timer will decrement to zero and result in switching back to system A, since operation in system A is preferred. If there is no preferred system, only the Z and X timers are needed in other embodiments.

In summary, a unique multi-bandwidth cellular telephone includes bandwidth switching in the receiver thereof for automatically operating on different cellular telephone systems. Bandwidth switching may be accomplished by switching between different filters in the intermediate frequency section of the receiver of the multi-bandwidth cellular telephone depending on which cellular telephone system is available. When service is not available in one of the cellular telephone systems, the unique multi-bandwidth cellular telephone automatically switches to the other cellular telephone system.

We claim:

1. A cellular telephone communicating cellular telephone calls on a first set of cellular radio channels having a first cellular telephone signalling protocol and a second set of cellular radio channels having a second cellular telephone signalling protocol, said cellular telephone comprising:

antenna means for receiving and transmitting cellular telephone call signals on said cellular radio channels;

dialing means for dialing digits of telephone numbers;

synthesizing means for generating a reference signal;

cellular transmitting means coupled to the antenna means for transmitting cellular telephone call signals on said cellular radio channels;

cellular receiving means coupled to the antenna means and the reference signal for receiving cellular telephone call signals on said cellular radio channels, said cellular receiving further including intermediate frequency means having dual-bandwidth filtering means and switching means for generating an intermediate frequency signal having a predetermined frequency, the dual-bandwidth filtering means switchable between a first predetermined bandwidth including the predetermined frequency and a second predetermined bandwidth that includes the predetermined frequency and has a magnitude less than that of the first predetermined bandwidth, and the switching means being responsive to a bandwidth control signal having first and second states for switching said dual-bandwidth filtering means between the first and second predetermined bandwidths, respectively; and control means including memory means for storing a control program, said control means being coupled to the dialing means, cellular transmitting means, and cellular receiving means for automatically transmitting and receiving cellular telephone calls on said cellular radio channels using the control program, said control means generating the first state of the bandwidth control signal for cellular telephone calls on said first set of cellular radio channels and generating the second state of the bandwidth control signal for cellular telephone calls on said second set of cellular radio channels.

2. The cellular telephone according to claim 1, wherein said dual-bandwidth filtering means includes first filtering means having the first predetermined bandwidth and second filtering means having the second predetermined bandwidth.

3. The cellular telephone according to claim 1, wherein said switching means includes analog switch means.

4. The cellular telephone according to claim 1, wherein said cellular transmitting means further includes power amplifying means responsive to a PA control signal for amplifying the cellular telephone call signals, means for detecting the magnitude of the amplified cellular telephone call signals, and means responsive to the detected magnitude of the amplified cellular telephone call signals for generating the PA control signal.

5. A cellular telephone communicating cellular telephone calls on a first set of cellular radio channels having a first cellular telephone signalling protocol and a second set of cellular radio channels having a second cellular telephone signalling protocol, said cellular telephone comprising:

antenna means for receiving and transmitting cellular telephone call signals on said cellular radio channels;

dialing means for dialing digits of telephone numbers;

synthesizing means for generating a reference signal;

cellular transmitting means coupled to the antenna means for transmitting cellular telephone call signals on said cellular radio channels;

cellular receiving means coupled to the antenna means and the reference signal for receiving cellular telephone call signals on said cellular radio channels, said cellular receiving means further including:

first intermediate frequency means including first filtering means for generating a first intermediate frequency signal having a first predetermined frequency, the first filtering means having a first predetermined bandwidth including the first predetermined frequency;

second intermediate frequency means coupled to the first intermediate frequency signal and including dual-bandwidth second filtering means for generating a second intermediate frequency signal having a second predetermined frequency, the dual-bandwidth second filtering means switchable between a second predetermined bandwidth including the second predetermined frequency and a third predetermined bandwidth that includes the second predetermined frequency and has a magnitude less than that of the second predetermined bandwidth;

detecting means coupled to the second intermediate frequency signal for detecting the received cellular telephone call signals; and switching means responsive to a bandwidth control signal having first and second states for switching said dual-bandwidth second filtering means between the second and third predetermined bandwidths, respectively; and control means including memory means for storing a control program, said control means being coupled to the dialing means, cellular transmitting means, and cellular receiving means for automatically transmitting and receiving cellular telephone calls on said cellular radio channels using the control program, said control means generating the first state of the bandwidth control signal for cellular telephone calls on said first set of cellular radio channels and generating the second state of the bandwidth control signal for cellular telephone calls on said second set of cellular radio channels.

6. The cellular telephone according to claim 5, wherein said dual-bandwidth second filtering means includes third filtering means having the second predetermined bandwidth and fourth filtering means having the third predetermined bandwidth.

7. The cellular telephone according to claim 5, wherein said switching means includes analog switch means.

8. A cellular telephone communicating cellular telephone calls on a first set of cellular radio channels having a first cellular telephone signalling protocol and a second set of cellular radio channels having a second cellular telephone signalling protocol, said cellular telephone comprising:

antenna means for receiving and transmitting cellular telephone call signals on said cellular radio channels;

transmitter filtering means coupled to the antenna means for filtering the transmitted cellular telephone call signals;

receiver filtering means coupled to the antenna means for filtering the received cellular telephone call signals;

dialing means for dialing digits of telephone numbers;

synthesizing means for generating a reference signal;

cellular transmitting means coupled to the transmitter filtering means for transmitting cellular telephone call signals on said cellular radio channels;

cellular receiving means coupled to the receiver filtering means and the reference signal for receiving cellular telephone call signals on said cellular radio channels, said cellular receiving means further including intermediate frequency means having dual-bandwidth filtering means and switching means for generating an intermediate frequency signal having a predetermined frequency, the dual-bandwidth filtering means switchable between a first predetermined bandwidth including the predetermined frequency and a second predetermined bandwidth that includes the predetermined frequency and has a magnitude less than that of the first predetermined bandwidth, and the switching means being responsive to a bandwidth control signal having first and second states for switching said dual-bandwidth filtering means between the first and second predetermined bandwidths, respectively; and control means including memory means for storing a control program, said control means being coupled to the dialing means, cellular transmitting means, and cellular receiving means for automatically transmitting and receiving cellular telephone calls on said cellular radio channels using the control program, said control means generating the first state of the bandwidth control signal for cellular telephone calls on said first set of cellular radio channels and generating the second state of the bandwidth control signal for cellular telephone calls on said second set of cellular radio channels.

9. The cellular telephone according to claim 8, wherein said switching means includes analog switch means.

10. The cellular telephone according to claim 8, wherein said cellular transmitting means further includes power amplifying means responsive to a PA control signal for amplifying the cellular telephone call signals, means for detecting the magnitude of the amplified cellular telephone call signals, and means responsive to the detected magnitude of the amplified cellular telephone call signals for generating the PA control signal.

11. The cellular telephone according to claim 8, wherein said dual-bandwidth filtering means includes first filtering means having the first predetermined bandwidth and second filtering means having the second predetermined bandwidth.

12. The cellular telephone according to claim 11, wherein said cellular transmitting means further includes power amplifying means responsive to a PA control signal for amplifying cellular telephone call signals, means for detecting the magnitude of the amplified cellular telephone call signals, and means responsive to the detected magnitude of the amplified cellular telephone call signals for generating the PA control signal.

* * * * *